United States Patent [19]

Kudo et al.

[11] 4,038,474

[45] July 26, 1977

[54] PROCESS FOR PREPARING NOVEL PETROLEUM RESIN EMPLOYING ALRX$_2$ AND ALKYL HALIDE OR HYDROGEN HALIDE

[75] Inventors: Ken-ichi Kudo; Yoshihiko Kitagawa; Hideyuki Kuribayashi, all of Niihama, Japan

[73] Assignee: Sumitomo Chemical Company, Limited, Osaka, Japan

[21] Appl. No.: 565,656

[22] Filed: Apr. 7, 1975

[30] Foreign Application Priority Data

Apr. 19, 1974 Japan ................................. 49-44690

[51] Int. Cl.$^2$ .................. C08F 4/52; C08F 10/00; C08F 120/00; C08F 136/00
[52] U.S. Cl. ..................................... 526/185; 526/290
[58] Field of Search ................... 260/82; 526/185, 290

[56] References Cited

U.S. PATENT DOCUMENTS

| | | | |
|---|---|---|---|
| 2,523,150 | 9/1950 | Schneider et al. | 260/82 |
| 2,604,465 | 7/1952 | Schneider et al. | 260/82 |
| 2,770,614 | 11/1956 | Howarth et al. | 260/82 |
| 3,644,252 | 2/1972 | Shenfeld et al. | 260/897 B |
| 3,860,543 | 1/1975 | Masuda et al. | 260/82 |
| 3,875,095 | 4/1975 | Yamada et al. | 260/82 |

*Primary Examiner*—Joseph L. Schofer
*Assistant Examiner*—Herbert J. Lilling
*Attorney, Agent, or Firm*—Stevens, Davis, Miller & Mosher

[57] ABSTRACT

A novel petroleum resin having not only a relatively low molecular weight but a narrow molecular weight distribution and having excellent characteristics as a tackifier particularly suitable for use in hot-melt adhesives and also suitable for synthetic rubbers, adhesive tapes, sealants, and the like, which resin is obtained by copolymerizing 20 to 80 parts by weight of a so-called spent C$_4$- or C$_5$-fraction obtained by removing most of the dienic constituents from the fractions mainly of C$_4$ or C$_5$ carbon atoms produced by petroleum cracking and 80 to 20 parts by weight of styrene and/or a styrene derivative with a catalyst system comprising an organoaluminum compound represented by the general formula AlRX$_2$ (wherein R is an alkyl group having 1 to 4 carbon atoms and X is a halogen atom) as main catalyst and an alkyl halide or a hydrogen halide as co-catalyst, in a hydrocarbon solvent at a temperature of 0° to 60° C.

15 Claims, No Drawings

PROCESS FOR PREPARING NOVEL PETROLEUM RESIN EMPLOYING ALRX$_2$ AND ALKYL HALIDE OR HYDROGEN HALIDE

This invention relates to a process for manufacturing a novel petroleum resin having excellent characteristics as a tackifier for use in a hot-melt adhesive.

It has been generally known that an aliphatic monoolefin and styrene and/or a styrene derivative are copolymerized by use of a catalyst of the Friedel-Crafts type such as aluminum chloride. The resin obtained by such a method, however, is undesirable as a tackifier for use in a hot-melt adhesive because of its poor compatibility with ethylene-vinyl acetate copolymers and other polymers and because of discoloration and other disadvantages.

An object of this invention is to provide a colorless and clear petroleum resin having such tackiness and excellent compatibility that are very valuable as tackifier for use in hot-melt adhesives.

Another object of this invention is to provide a novel method for manufacturing the said petroleum resin from aliphatic monoolefins and styrene and/or a styrene derivative.

A further object of this invention is to utilize effectively the monoolefins contained in C$_4$ and C$_5$ fractions produced from petroleum cracking as the source of the above-said aliphatic monoolefins.

Other objects of this invention will be apparent from the following description.

The present inventors were engaged in investigations on effective utilization of the monoolefins in C$_4$ and C$_5$ fractions produced by petroleum cracking. As a result, it was found that a colorless and clear resin having such tackiness and excellent compatibility because of not only a relatively low molecular weight but a narrow molecular weight distribution that are very valuable as a tackifier for use in hot-melt adhesives is easily obtained by copolymerizing said monoolefins with styrene and/or a styrene derivative, in a hydrocarbon solvent and at a temperature of 0° to 60° C., with a catalyst system comprising an organoaluminum compound represented by the general formula AlRX$_2$ (wherein R is an alkyl group having 1 to 4 carbon atoms, X is a halogen atom) as main catalyst and an alkyl halide or a hydrogen halide as co-catalyst. Based on this finding, the present invention has been accomplished.

Since the petroleum resin obtained according to this invention is excellent in compatibility, tackiness, color, and, in addition, in thermal stability and solubility, it may be used very effectively as a tackifier for use not only in hot-melt adhesives, but also in adhesive tapes, synthetic rubbers, sealants, and the like.

Sources of aliphatic monoolefins for use in this invention are so-called spent C$_4$ and C$_5$ fractions. The spent C$_4$ and C$_5$ fractions are obtained from C$_4$ and C$_5$ fractions produced by petroleum cracking, which comprise compounds having mainly four and five carbon atoms, by removing most of dienic constituents contained in the C$_4$ and C$_5$ fractions. As the spent C$_4$ and C$_5$ fractions for use in this invention, those having no dienic constituents such as butadiene, isoprene, 1,3-pentadiene and cyclopentadiene are preferable. However, spent C$_4$ and C$_5$ fractions having 5% by weight or less of total content of these dienic constituents hardly cause discoloration of resin due to the dienic constituents and may be similarly used. The presence of 5% by weight or less of C$_3$, C$_6$ or higher monoolefins based on the aliphatic monoolefins mentioned above has no harmful effect.

Although the spent C$_4$ and C$_5$ fractions are generally used as they are, it is possible to use spent C$_4$ and C$_5$ fractions mixed with some amounts of C$_4$ and C$_5$ monoolefins such as butene-1, isobutylene, pentene-1, 2-methylbutene-1 and 3-methylbutene-1 depending upon the intended use of the resin. In this invention, C$_4$ fraction produced by petroleum cracking from which butadiene contained therein is removed, that is, so-called spent C$_4$ fraction is most preferably used. The styrene and its derivatives for use in this invention include styrene, α-methylstyrene, vinyltoluene, and dimethylstyrene, which may be used each alone or in mixtures.

The suitable monomer compositions for the copolymerization are 80 to 20 parts by weight of styrene and/or a derivative thereof for 20 to 80 parts by weight of spent C$_4$ and C$_5$ fractions. When a resin of higher softening point is required, a higher proportion of styrene and/or a styrene derivative is used. If the spent C$_4$ and C$_5$ fractions are reduced below 20 parts by weight, a resin with markedly reduced compatibility is formed, while if they are increased above 80 parts by weight, softening point of the resin becomes low and a highly viscous liquid resin is formed, both resins being undesirable for the object of this invention. The preferable monomer composition is 60 to 40 parts by weight of styrene and/or a derivative thereof for 40 to 60 parts by weight of spent C$_4$ and C$_5$ fractions.

The catalyst system according to this invention comprises an organoaluminum compound represented by the formula AlRX$_2$ (where R is an alkyl group having 1 to 4 carbon atoms, X is a halogen atom) and a co-catalyst selected from alkyl halides and hydrogen halides. The organoaluminum compounds suitable for use are methylaluminum dichloride, ethylaluminum dichloride, n-propylaluminum dichloride, isopropylaluminum dichloride, isobutylaluminum dichloride, methylaluminum dibromide and ethylaluminum dibromide. Of these, ethylaluminum dichloride is preferred.

The alkyl halides for use as co-catalysts with organoaluminum compounds are isopropyl chloride, isobutyl chloride, sec-butyl chloride, tert-butyl chloride, and tert-butyl bromide. Of these, tert-butyl chloride and tert-butyl bromide are preferred. The suitable hydrogen halides are hydrogen chloride and hydrogen bromide. These alkyl halides are hydrogen halides can be used in combinations of two or more members. The suitable molar ratio of the co-catalyst to the organoaluminum compound is from 0.01 to 2, preferably from 0.1 to 1, more preferably from 0.4 to 0.8. If the molar ratio of a co-catalyst to an organoaluminum compound is below 0.01 or above 2, the catalyst system becomes inferior in activity and unsuitable for the object of this invention.

The amount of organoaluminum compound to be used is 0.1 to 5%, preferably from 0.5 to 3%, by weight based on the weight of monomer mixture. If it is used in an amount below 0.1% by weight, the monomer conversion becomes inferior, while if it is used in an amount above 5% by weight, the conversion will scarcely be increased.

Although the contact of monomers with the catalytic system may be conducted after the organoaluminum compound and co-catalyst have been mixed and aged, it is preferable to mix both in the presence of a monomer mixture in the polymerization reactor. The latter manner is more industrially advantageous than the former since there are no losses of catalysts in preparation of them and the catalytic activity thereof is relatively high.

The hydrocarbon solvents suitable for use in this invention include aliphatic hydrocarbons such as hexane, heptane, and the like, aromatic hydrocarbons such as benzene, toluene, xylene, ethylbenzene, and the like, and cyclohexane. Further, the paraffins contained in spent $C_4$ and $C_5$ fractions can be utilized conveniently as solvent.

Since an aliphatic hydrocarbon solvent tends to increase softening point of the resin formed, while an aromatic hydrocarbon solvent tends to decrease the softening point, it is possible to use these two types of hydrocarbons in suitable mixtures according to the intended object.

In view of the dispersion of catalyst and the removal of heat of polymerization, a suitable weight ratio of the hydrocarbon solvent to the monomer mixture is in the range from 0.2 to 3.0, preferably from 0.5 to 2.0.

The polymerization can be carried out at a temperature in the range from 0° to 60° C., preferably from 10° to 50° C. If the polymerization temperature is below 0° C., a resin of high molecular weight and poor compatibility will be formed, while if it exceeds 60° C., only a resin with very low molecular weight will be formed. When such resins are used as a tackifier in a hot-melt adhesive, there may arise such undesirable problems as insufficient compatibility or fuming.

The polymerization according to this invention can be carried out by any polymerization procedure such as batchwise polymerization, semi-batchwise polymerization, or continuous polymerization.

The polymerization is conducted generally for 3 minutes to 5 hours, though there is no particular restriction on the duration of polymerization.

The polymerization mixture obtained according to this invention is contacted with, for example, methanol to terminate polymerization, washed with an alkali solution and water to remove the catalyst residue. The solvent and low molecular weight polymer are removed to obtain the petroleum resin.

Now, in the specification of U.S. Pat. No. 3,644,252, there is mentioned that isobutylene and styrene are copolymerized in organic solvent with a catalyst system obtained by reacting and aging an alkylaluminum dihalide with a co-catalyst selected from water, alkylhalide, hydrogen halide and alcohol in organic solvent to obtain a resin suitable for a hot-melt adhesive. On the other hand, in the present invention, since spent $C_4$ and $C_5$ fractions are used instead of the isobutylene, compounds contained in these fractions act as a chain transfer agent and accordingly it is possible to obtain a resin of a relatively low molecular weight and narrow molecular weight distribution (the number average molecular weight is less than 2000 and the heterogeneity index, which is defined as the ratio of the weight average molecular weight $\overline{M}w$ to the number average molecular weight $\overline{M}n$, $\overline{M}w/\overline{M}n$, is less than 1.5) and having excellent compatibility and solubility as compared with a resin obtained by using isobutylene alone. In other words, an object of using a mixture of fractions such as spent $C_4$ and $C_5$ fractions in the present invention is to obtain a resin having excellent properties at a low cost as compared with a resin obtained from a pure compound such as isobutylene.

This invention is illustrated below in detail with reference to Examples, but the invention is not limited thereto.

Among the physical characteristics of the resin shown in Examples, the softening point was measured by the ring and ball method specified in JIS-K2531 and the molecular weight (number-average molecular weight) was determined by Vapor Pressure Osmometry techniques and a heterogeneity index, which is defined as the ratio of the weight average molecular weight to the number average molecular weight, was determined using Gel Permeation Chromatography techniques.

EXAMPLE 1

Into a 300-ml glass reactor provided with a thermometer, reflux condenser, stirrer, monomer inlet, catalyst inlet, and overflow exit, which had been flushed with nitrogen to replace the air, was fed at a rate of 1 liter/hour through the monomer inlet a mixture comprising 20 parts by weight of the spent $C_4$-fraction having a composition shown in Table 1, 30 parts by weight of styrene, 50 parts by weight of xylene, and 0.19 part by weight of tert-butyl chloride. At the same time, on the other hand, into the reactor was fed with stirring at a rate of 50 ml/hour a xylene solution containing 10% by weight of ethylaluminum dichloride (concentration of ethylaluminum dichloride based on monomer mixture, 1% by weight; molar ratio of ethylaluminum dichloride to tert-butyl chloride, 1/0.5) to allow the reaction to proceed. Polymerization was carried out while removing the polymerization heat by external cooling to maintain the temperature at 25° C. The polymerization mixture flowed out of the overflow exit was continuously contacted with methanol to terminate the polymerization. The polymerization mixture obtained (after the polymerization had been terminated by the addition of methanol) during an interval of 15 minutes after 1 hour from the start of polymerization was washed with 30 ml of an aqueous solution containing 20% by weight of sodium hydroxide and then freed from the spent sodium hydroxide solution by decantation. The resulting polymer solution was concentrated in a rotary evaporator under reduced pressure (150 mmHg), at 230° C., under a nitrogen stream. A colorless clear petroleum resin was obtained in a yield of 71%. The resin had a softening point of 68.5° C., a molecular weight of 970 and a heterogeneity index of 1.2. It showed excellent tackiness and excellent compatibility with an ethylene-vinyl acetate copolymer and could be used very satisfactorily as a tackifier in a hot-melt adhesive (it was found that the same applies to the resins obtained in Examples 2 to 7).

EXAMPLE 2

The procedure of Example 1 was followed, except that heptane was used in place of xylene. A resin having a softening point of 81.0° C., a molecular weight of 1290 and a heterogeneity index of 1.3 was obtained in a yield of 75%.

EXAMPLE 3

Polymerization was carried out in the same manner as in Example 1, except that the polymerization temperature was 10° C. in place of 25° C. A resin having a softening point of 69.5° C. and a molecular weight of 1050 was obtained in a yield of 73.0%.

EXAMPLE 4

The procedure of Example 1 was followed, except that a mixture comprising 20 parts by weight of the spent $C_4$-fraction shown in Table 1, 30 parts by weight of α-methylstyrene, 50 parts by weight of xylene, and 0.076 part by weight of hydrogen chloride was used. A resin having a softening point of 52.5° C. and a molecular weight of 1130 was obtained in a yield of 34%.

EXAMPLE 5

Polymerization was carried out in the same manner as in Example 4, except that a mixture of 15 parts by weight of styrene and 15 parts by weight of vinyltoluene (a mixture of 65% of m-vinyltoluene and 35% of p-vinyltoluene) was used in place of 30 parts by weight of α-methylstyrene. A resin having a softening point of 68.5° C. and a molecular weight of 900 was obtained in a yield of 68%.

EXAMPLE 6

The procedure of the Example 1 was followed, except that a mixture comprising 15 parts by weight of the spent $C_4$-fraction shown in Table 1, 35 parts by weight of the spent $C_5$-fraction shown in Table 2, 25 parts by weight of styrene, 25 parts by weight of xylene and 0.076 part by weight of hydrogen chloride was used as the starting material. A resin having an softening point of 60° C. and a molecular weight of 960 was obtained in a yield of 58%.

EXAMPLE 7

Into a 250-ml three-necked glass autoclave provided with a thermometer, stirrer, and feed inlet, which had been flushed with nitrogen to replace the air, were charged with stirring 25 g of the spent $C_4$-fraction, 25 g of styrene, 40 g of xylene, and 10 g of a xylene solution containing 2.75% by weight of tert-butyl bromide. To the stirred autoclave, which had been maintained at 50° C., was fed 10 g of xylene solution containing 5% by weight of ethylaluminum dichloride over a period of 10 minutes, to initiate the polymerization. After the autoclave had been maintained at 50° C. for a further 50 minutes to continue the polymerization, 30 ml of methanol was added into the autoclave by means of a plunger pump to terminate the polymerization. The resulting polymerization mixture was washed and concentrated in the same manner as in Example 1 to obtain a colorless clear resin having a softening point of 42° C. and a molecular weight of 760 in a yield of 79%.

COMPARATIVE EXAMPLE 1

Polymerization was carried out in the same manner as in Example 1, except that a mixture comprising 7.5 parts by weight of styrene, 42.5 parts by weight of the spent $C_4$-fraction, 50 parts by weight of xylene, and 0.076 part by weight of hydrogen chloride was used as the starting material. The resin obtained in a yield of 44% was a colorless clear liquid having a molecular weight of 1,300. Being a liquid, the resin was found to be of no practical value as a tackifier for use in a hot-melt adhesive.

COMPARATIVE EXAMPLE 2

The procedure of Example 1 was followed, except that the feeding rate of the starting mixture was 0.58 liter/hour instead of 1 liter/hour, the feeding rate of the xylene solution containing 10% by weight of ethylaluminum dichloride was 3.0 ml/hour instead of 50 ml/hour, and the polymerization temperature was −25° C. The polymerization mixture obtained during an interval of 30 minutes after 2 hours from the start of polymerization was treated in the same manner as in Example 1 and there was obtained a colorless clear resin having a softening point of 60.5° C. and a molecular weight of 1830 in a yield of 57%. Since the resin obtained was inferior in compatibility with an ethylene-vinyl acetate copolymer and, hence, poor in adhesiveness, it was of no appreciable value as a tackifier for use in hot-melt adhesives.

COMPARATIVE EXAMPLE 3

Into a 300-ml glass reactor provided with a thermometer, reflux condenser, stirrer, and dropping funnel, which had been flushed with nitrogen to replace the air, were charged 25 g of the spent $C_4$-fraction, 25 g of styrene, and 40 g of xylene. After the temperature of the reactor was set at 25° C., into the reactor was added with stirring dropwise through the dropping funnel 2.0 g of an anhydrous aluminum chloride complex catalyst (aluminum chloride/hydrogen chloride/mesitylene = 1/1/1 in molar ratio) over a period of 10 minutes. After the reaction was continued for further 20 minutes, 30 ml of methanol was added to terminate the polymerization. The resulting polymerization mixture was treated in the same manner as in Example 1. After washing with an aqueous sodium hydroxide solution, the polymerizate solution contained a gel-like precipitate. The polymerizate solution was separated from the gel-like precipitate and the aqueous layer and then concentrated to obtain a yellow translucent petroleum resin having a softening point of 74° C and a molecular weight of 1020 in a yield of 74%.

Because of discoloration and insufficient compatibility with an ethylene-vinyl acetate copolymer, the resin thus obtained was found to be of no value as a tackifier for use in a hot-melt adhesive.

COMPARATIVE EXAMPLE 4

Into the same reactor as used in Comparative Example 3, which had been flushed with nitrogen to replace the air, were charged 20 g of isobutylene, 30 g of styrene, and 50 g of hexane. Into the reactor maintained at 20° C., was added dropwise with stirring 2.5 g of a heptane solution of an ethylaluminum dichloride-water catalyst (a 10-% by weight ethylaluminum dichloride solution; ethylaluminum dichloride/water = 1/0.05 in molar ratio) over a period of 30 minutes to allow the polymerization to proceed. After the addition was complete, the stirring was continued for further 60 minutes and then, 30 ml of methanol was added to terminate the polymerization. The resulting polymerizate solution was treated in the same manner as in Example 1 to obtain a colorless clear resin having a softening point of 81.5° C., a molecular weight of 2490 and a heterogeneity index of 1.9 in a yield of 92%.

The resin was inferior in compatibility and poor in adhesiveness so that it had no appreciable value as a tackifier for use in a hot-melt adhesive.

Table 1

| Composition of spent $C_4$-fraction. | |
|---|---|
| Constituent | % by weight |
| Isobutane | 1.3 |
| n-Butane | 6.6 |
| 1-Butene | 24.0 |
| Isobutylene | 47.1 |
| trans-2-Butene | 10.2 |
| cis-2-Butene | 7.9 |
| Others | 2.9 |

Table 2

Composition of spent $C_5$-fraction.

| Constituent | % by weight |
|---|---|
| Isopentane | 25.1 |
| n-Pentane | 40.3 |
| 1-Pentene | 6.2 |
| 2-Methyl-1-butene / trans-2-pentene | 13.2 |
| 2-Methylpentane / 2,3-Dimethylbutane / cis-2-Pentene | 2.7 |
| 3-Methylpentane / 2-Methyl-2-butene | 6.0 |
| Cyclopentene | 1.7 |
| Others | 4.8 |

What is claimed is:

1. A process for manufacturing a petroleum resin, characterized by copolymerizing 20 to 80 parts by weight of a so-called spent $C_4$- or $C_5$-fraction obtained by removing most of the dienic constituents from the fraction comprising compounds having mainly four or five carbon atoms produced by petroleum cracking and 80 to 20 parts by weight of styrene and/or a styrene derivative with a catalyst system comprising an organoaluminum compound represented by the general formula $AlRX_2$ (wherein R is an alkyl group having 1 to 4 carbon atoms and X is a halogen atom) as main catalyst and an alkyl halide or a hydrogen halide as co-catalyst, in a hydrocarbon solvent at a temperature of 0° to 60° C.

2. A process for manufacturing a petroleum resin according to claim 1, wherein the total dienic constituent content of the spent $C_4$- or $C_5$-fraction is 5% by weight or less.

3. A process for manufacturing a petroleum resin according to claim 1, wherein 20 to 80 parts by weight of the spent $C_4$-fraction obtained by removing dienic constituents from a $C_4$-fraction produced by petroleum cracking and 80 to 20 parts by weight of styrene and/or a styrene derivative are copolymerized.

4. A process for manufacturing a petroleum resin according to claim 1, wherein styrene and/or the styrene derivative is styrene, α-methylstyrene, vinyltoluene, or dimethylstyrene or a mixture of two or more of these.

5. A process for manufacturing a petroleum resin according to claim 1, wherein the monomer composition is 40 to 60 parts by weight of the spent $C_4$- or $C_5$-fraction and 60 to 40 parts by weight of styrene and/or a styrene derivative.

6. A process for manufacturing a petroleum resin according to claim 1, wherein the organoaluminum compound is ethylaluminum dichloride.

7. A process for manufacturing a petroleum resin according to claim 1, wherein the amount to be used of the organoaluminum compound is 0.5 to 3% by weight based on total monomer.

8. A process for manufacturing a petroleum resin according to claim 1, wherein the alkyl halide is tert-butyl chloride or tert-butyl bromide.

9. A process for manufacturing a petroleum resin according to claim 1, wherein the hydrogen halide is hydrogen chloride or hydrogen bromide.

10. A process for manufacturing a petroleum resin according to claim 1, wherein the molar ratio of the co-catalyst to the organoaluminum compound is in the range from 0.1 to 1.

11. A process for manufacturing a petroleum resin according to claim 1, wherein the molar ratio of co-catalyst to the organoaluminum compound is in the range of 0.4 to 0.8.

12. A process for manufacturing a petroleum resin according to claim 1, wherein the catalysts are mixed with the monomer components in a polymerization reactor.

13. A process for manufacturing a petroleum resin according to claim 1, wherein the hydrocarbon solvent is an aliphatic hydrocarbon selected from hexane, heptane, and other paraffins; an aromatic hydrocarbon selected from benzene, toluene, xylene, and ethylbenzene; cyclohexane, or a mixture of two or more of these.

14. A process for manufacturing a petroleum resin according to claim 1, wherein the weight ratio of the hydrocarbon solvent to be used to the monomer components is in the range from 0.5 to 2.0.

15. A process for manufacturing a petroleum resin according to claim 1, wherein copolymerization is carried out at a temperature in the range from 10° to 50° C.

* * * * *